United States Patent [19]
Carlson

[11] Patent Number: 4,805,996
[45] Date of Patent: Feb. 21, 1989

[54] ELECTROCHROMIC OPTICAL SHUTTER

[75] Inventor: Robert L. Carlson, Southgate, Mich.

[73] Assignee: Ford Motor Company, Dearborn, Mich.

[21] Appl. No.: 943,234

[22] Filed: Dec. 18, 1986

[51] Int. Cl.$^4$ ............................................... G02F 1/01
[52] U.S. Cl. .................................................... 350/357
[58] Field of Search ....................... 350/357, 355, 356; 252/408.1, 600

[56] References Cited

U.S. PATENT DOCUMENTS

| | | | |
|---|---|---|---|
| 4,256,379 | 3/1981 | Green | 350/357 |
| 4,278,329 | 7/1981 | Matsuhire | 350/357 |
| 4,297,005 | 10/1981 | Johnson, Jr. et al. | 350/357 |
| 4,416,517 | 11/1983 | Beall et al. | 350/357 |
| 4,482,216 | 11/1984 | Hashimoto | 350/357 |

FOREIGN PATENT DOCUMENTS

| | | | |
|---|---|---|---|
| 0143419 | 11/1981 | Japan | 350/357 |
| 0122420 | 7/1982 | Japan | 350/357 |

*Primary Examiner*—Eugene R. LaRoche
*Assistant Examiner*—Nathan W. McCutcheon
*Attorney, Agent, or Firm*—Lorraine S. Melotik; Roger L. May

[57] ABSTRACT

This specification is directed to electrochromic optical shutter (10) in which an electrochromic material (12), an ion conductor (14), and a counter electrode (16), in that order, are sandwiched between visibly transparent electrodes (18). The shutter is improved by forming the ion conductor from a lithium-doped aluminum oxide applied to, as a base therefor, either the electrochromic material or the counter electrode. The material is applied by a pyrolytic spray process in which a solution containing lithium and aluminum as pyrolyzable organic salts dissolved in an organic medium are sprayed on the base. The base has been previously heated to a temperature sufficient to pyrolyze the sprayed materials and form a lithium-doped, aluminum oxide ion conductor layer. The counter electrode may be removed, in which case the ion conductor would be applied to either the electrochromic material or one of the visibly transparent electrodes.

4 Claims, 1 Drawing Sheet

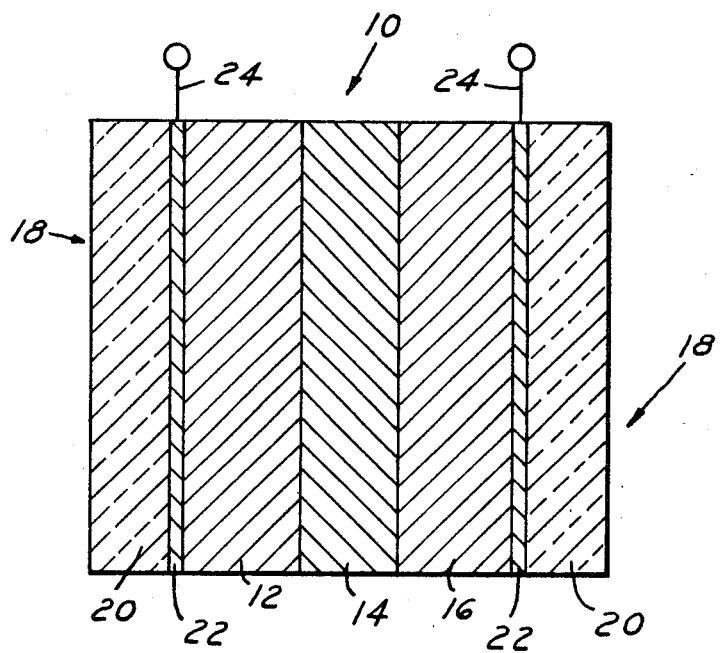

ELECTROCHROMIC OPTICAL SHUTTER

TECHNICAL FIELD

Electrochromic optical shutters are devices which may be electrically switched from a transparent state to a nontransparent state. In other words, depending upon the state of charge in the electrochromic optical shutter, one may either view something through it or one may not view something through it. The change is brought about by changing the polarity of an applied field (or voltage).

BACKGROUND AND PRIOR ART STATEMENT

Electrochromic optical shutters are an emerging technology in the motor vehicle field as well as the commercial glass field. This technology can be used to form so-called "privacy" glass windows for motor vehicles. In one state of electrical charge, the electrochromic optical shutter would be transparent or bleached and people within the vehicle can look at what is outside. Also, people on the outside of the vehicle may view the interior of the vehicle. When the electrochromic optical shutter is switched to its colored state, the people within the vehicle cannot view anything through the colored electrochromic optical shutter nor may the people within the vehicle be viewed by those outside the vehicle through such a colored electrochromic optical shutter.

Ford Motor Company is attempting to develop this type of electrochromic optical shutter for use in vehicles such as small and large vans, recreational 4-wheel drive vehicles, and, as well as, commercial and residential window glass for improving building energy efficiency. I have been recently working on electrochromic optical shutters attempting to develop them for use in such vehicles and commercial and residential windows.

No search was conducted on the subject matter of this application in the U.S. Patent Office or in any other search facility. I am unaware of any prior art more relevant than that set forth in an article presented at SPIE 29th Annual International Technical Symposium, on Optical and Electro-Optical Engineering, in San Diego, Calif. during 1985. The paper is entitled "Chemical and Optical Properties of Electrochromic Nickel Oxide Films."

DISCLOSURE OF THE INVENTION

This invention relates to an improvement in an electrochromic optical shutter and, more particularly, is directed an improvement in an electrochromic optical shutter in which an electrochromic material, an ion conductor, and a counter electrode, in that order, are sandwiched between visibly transparent electrodes.

In accordance with the teachings of my invention, the improved electrochromic optical shutter is one wherein the ion conductor is formed of a lithium-doped aluminum oxide. This lithium-doped aluminum oxide is applied to, as a base therefor, either the electrochromic material or the counter electrode by a pyrolytic spray process. In the pyrolytic spray process, a solution containing lithium and aluminum as pyrolyzable organic salts dissolved in an organic medium are sprayed on the base. The base is heated to a temperature sufficient to pyrolyze the sprayed materials to thereby form a lithium-doped, aluminum oxide ion conductor layer. It is, of course, apparent that the base must be heated prior to the application of the pyrolyzable organic salts dissolved in the organic medium.

In another embodiment of the improved ion conductor for an electrochromic optical shutter, the counter electrode is not used.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of a specific embodiment when read in conjunction with the accompanying drawing which is a schematic representation of an electrochromic optical shutter in accordance with the teachings of my invention.

BEST MODE AND INDUSTRIAL APPLICABILITY

The following description is what I now consider to be a preferred embodiment of the electrochromic optical shutter of my inventive construction. The following description also sets forth what I now contemplate to be the best mode of construction of my inventive electrochromic optical shutter. The description is not intended to be a limitation upon the broader principles of this construction, and while preferred material are used to form the construction in accordance with the requirements of the law, it does not mean that other materials cannot be used to make this construction in areas where criticality of the material has not been specified.

The property of electrochromism is very important to the development of large area optical shutters which may be used as information displays or as windows for motor vehicles. The switching speed is not a key consideration. From a building energy efficiency viewpoint in regard to using electrochromic glazings, the ability to dynamically control incoming solar radiation either in the visible or near infrared spectral regions is very attractive. As mentioned above, electrochromism also has an important future in automotive glazings.

Electrochromism is known to occur in several transition metal oxides. The characteristics of electrochromism are manifest by a reversible color change, usually switching from an uncolored state to a color state as the result of an applied electric current. Electrochromic materials exhibit both chemical and optical changes by dual ion and electron ejection or injection. As a result, color centers are formed in the material that produce optical adsorption in the visible wavelength region. Also, in certain cases, large changes in electrical conductivity can occur, causing significant infrared reflectivity switching effects. Coloration of an electrochromic material can occur on either the cathodic or anodic cycle. For nickel oxide, coloration occurs by chemical oxidation during anodization. A very important property of electrochromic films is that the exhibit mixed conductivity, both electronic and ionic, in which ions can be rapidly and reversibly inserted in step with injected or ejected electrons.

There is shown in the Figure, an electrochromic optical shutter, generally identified by the numeral 10. In accordance with the teachings of a preferred embodiment, the shutter has an electrochromic material 12. In accordance with the preferred embodiment, the electrochromic material is electrochemically deposited nickel oxide. The next layer is an ion conductor 14. The ion conductor 14 is what is my invention and it will be described in greater detail hereinbelow. The next layer is a counter electrode 16. This counter electrode may be formed of nickel oxide, pyrolytically applied. The reason it is pyrolytically applied is that this form of nickel oxide, for some reason or other, is not electrochromic as is nickel oxide which has been applied by electrochemical deposition or by anodization of nickel electrodes. This material is more fully discussed in my copending application, entitled "Improved Counter Electrode for an Electrochromic Optical Shutter", filed on even date herewith. It is not mandatory to use a counter electrode 16. However, by using such a counter electrode, there is a greater ability for storing ions necessary for the electrochromic switching of the electrochromic material. Thus, by having this storage capacity, it is easier to switch the electrochromic material 12 when so desired.

In accordance with the teachings of my invention, the ion conductor 14 is applied to, as a base therefor, either the electrochromic material 12 or the counter electrode 16 in the preferred embodiment by a pyrolytic spray process. In the pyrolytic spray process, a solution containing lithium and aluminum as pyrolyzable organic salts in an organic medium are sprayed on the heated base. The base has been previously heated to a temperature sufficient to pyrolyze the sprayed material and to form a lithium-doped, aluminum oxide ion conducting layer 14. A suitable solution for pyrolytic spray is one which contains 157 grams of methylene chloride, 97 grams methanol, 3 grams lithium acetyl acetonate (AOAc), and 12 grams aluminum AcAc. The base material is preheated to a temperature of 1100° F. prior to the spraying operation.

Visibly transparent electrodes, generally identified by the numerals 18-18, are placed on either side of the sandwiched elements. These visibly transparent electrodes are formed from a glass sheet 20 having a conductive tin oxide coating 22 thereon. Suitable electric leads 24 extend from the conductive tin oxide coatings 22-22 so that reversible current supply may be directed to the electrochromic optical shutter 10.

An operation of the electrochromic optical shutter of my invention occurs when electrons are driven from left to right as viewed in the drawing and ions move from right to left. As a result of this action, the electrochromic material is darkened. Reverse operation, of course, lightens the material and makes it transparent. The particular improvement of my invention is the use of lithium ions from a solid state source instead of liquid electrolyte as the ions which migrate into and out of the electrochromic optical shutter in order to switch it optically from transparent to opaque.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention. For example, the counter electrode 16 may be eliminated if fast optical switching is not a desired attribute of the electrochromic optical shutter.

I claim:

1. An electrochromic optical shutter comprising an electrochromic material, an ion conductor, and a counter electrode, in that order, sandwiched between visibly transparent electrodes, wherein said ion conductor comprises a solid state lithium-doped aluminum oxide having been applied to, as a base therefor, either said electrochromic material or said counter electrode by a pyrolytic spray process in which a solution containing lithium and aluminum as pyrolyzable organic salts dissolved in an organic medium are sprayed on said base heated to a temperature sufficient to pyrolyze said sprayed materials and form a lithium-doped, aluminum oxide ion conductor layer.

2. An electrochromic optical shutter comprising an electrochromic material and an ion conductor sandwiched between visibly transparent electrodes, wherein said ion conductor comprises a solid state lithium-doped aluminum oxide having been applied to, as a base therefor, either said electrochromic material or one of said visibly transparent electrodes in juxtaposition thereto by a pyrolytic spray process in which a solution containing lithium and aluminum as well as pyrolyzable organic salts dissolved in an organic medium are sprayed on said base heated to a temperature sufficient to pyrolyze said sprayed materials and form a lithium-doped, aluminum oxide ion conductor layer.

3. A method of making an electrochromic optical shutter which comprises an electrochromic material, an ion conductor, and a counter electrode, in that order, sandwiched between visibly transparent electrodes, wherein the method comprises forming said ion conductor of a solid state lithium-doped aluminum oxide applied to, as a base therefor, either said electrochromic material or said counter electrode by a pyrolytic spray process in which a solution containing lithium and aluminum as pyrolyzable organic salts dissolved in an organic medium are sprayed on said base heated to a temperature sufficient to pyrolyze said sprayed materials and form a lithium-doped, aluminum oxide ion conductor layer.

4. A method of making an electrochromic optical shutter comprising an electrochromic material and an ion conductor sandwiched between visibly transparent electrodes, wherein the method comprises forming said ion conductor of a solid state lithium-doped aluminum oxide applied to, as a base therefor, either said electrochromic material or one of said visibly transparent electrodes in juxtaposition thereto by a pyrolytic spray process in which a solution containing lithium and aluminum as well as pyrolyzable organic salts dissolved in an organic medium are sprayed on said base heated to a temperature sufficient to pyrolyze said sprayed materials and form a lithium-doped, aluminum oxide ion conductor layer.

* * * * *